United States Patent [19]

Hegedus et al.

[11] Patent Number: 5,089,551
[45] Date of Patent: Feb. 18, 1992

[54] CORROSION-RESISTANT ALKYD COATINGS

[75] Inventors: Charles R. Hegedus, Warrington, Pa.; Donald J. Hirst, Mt. Laurel; William J. Green, Clementon, both of N.J.; Anthony T. Eng, Philadelphia, Pa.

[73] Assignee: The United States of America as represented by the Secretary of the Navy, Washington, D.C.

[21] Appl. No.: 627,670

[22] Filed: Dec. 14, 1990

Related U.S. Application Data

[63] Continuation-in-part of Ser. No. 593,416, Sep. 28, 1990, Pat. No. 5,059,640, which is a continuation-in-part of Ser. No. 442,085, Nov. 28, 1989, Pat. No. 5,043,373, which is a continuation-in-part of Ser. No. 331,200, Mar. 28, 1989, Pat. No. 4,885,324, which is a continuation of Ser. No. 211,026, Jun. 16, 1988, abandoned.

[51] Int. Cl.$^5$ ............................................. C08L 75/00
[52] U.S. Cl. ..................................................... 524/396
[58] Field of Search ......................................... 524/396

[56] References Cited

U.S. PATENT DOCUMENTS 4,401,792 8/1983 Axelrod et al. ..................... 524/396

Primary Examiner—Maurice J. Welsh
Attorney, Agent, or Firm—James V. Tura; James B. Bechtel; Susan E. Verona

[57] ABSTRACT

This invention relates to a corrosion-resistant coating capable of being applied to various substrates, e.g., particularly metal and plastic surfaces, as a single coat characterized as having high-gloss, good adhesion and a high degree of flexibility. The corrosion inhibiting coating comprises an alkyd resin containing an effective amount of a corrosion-inhibiting pigment consisting essentially of critical amounts of at least one zinc phosphate, zinc molybdate and at least one zinc salt of a benzoic acid.

15 Claims, No Drawings

CORROSION-RESISTANT ALKYD COATINGS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of copending application Ser. No. 07/593,416 filed Sept. 28, 1990, now U.S. Pat. No. 5,059,640, which in turn is a continuation-in-part of copending applications Ser. No. 07/442,085 filed on Nov. 28, 1988, now U.S. Pat. No. 5,043,373, which in turn is a continuation-in-part of copending application Ser. No. 07/331,200 filed Mar. 28, 1989 now U.S. Pat. No. 4,885,324 which in turn is a continuation of application 07/211,026 filed June 16, 1988, now abandoned.

BACKGROUND OF THE INVENTION

This invention relates to coating compositions and more specifically to corrosion-resisting alkyd coating compositions which can be applied by various methods directly onto surfaces and particularly metal surfaces and polymeric or plastic substrates without the need for an undercoat.

Metal substrates, and particularly metal exposed to extreme environmental conditions, require the protection of coatings capable of resisting corrosive environments, e.g., ships and military aircraft are exposed to seawater spray and other corrosive reagents including acid-forming gases, e.g. sulfur dioxide and the like. In addition to ships and aircraft, particularly military aircraft, various types of machinery and farm equipment used in industrial environments where fossil fuels generate corrosive agents need protection against reagents such as surfur and other acid-forming gases. In addition to corrosion, it is important that the coatings be resistant to other chemicals and have physical characteristics which enable the coating to be applied to the substrate without difficulty. These coatings should exhibit good adhesion and have a high degree of flexibility.

Presently, coatings attempting to comply with the above-mentioned requirements rely on the use of a plurality of films, i.e. an undercoat with a topcoat, comprising, for example, an epoxy undercoat and a polyurethane topcoat. The epoxy primers used in the military are specifically designed to adhere to metal surfaces. These primecoats, however, generally require a topcoat, since the primers do not have the required flexibility, particularly at low temperatures, and therefore results in extensive cracking and/or blistering in areas which are highly flexible. Moreover, the primer coats are not generally resistant to harsh weather conditions and are difficult to formulate in the multi-colors required for military aircraft. The alkyd coating compositions of this invention, however, are resistant to harsh weather conditions and various chemicals including saltwater and acidic components, and also have the required degree of flexibility. In addition, it was necessary heretofore to provide a plurality of films thereby forming a total film thickness ranging up to about 0.005 inches e.g. up to 10 mils or greater which adds considerable weight to the aircraft. Thus, the multi-coat finishes utilized heretofore required a plurality of film thickness which are very time consuming in applying because of the drying time between each application. Moreover, it is obvious that the removal of the two coat system can likewise be difficult and time consuming and requires the use of large amounts of organic solvents causing objectionable emissions.

In accordance with this invention, the corrosion resistant costings comprise an alkyd binder, i.e. a silicone modified alkyd resin such as Varkyd 385-50E. More specificallly, the coating compositions of this invention comprises approximately 100 parts by weight of an alkyd resin in combination with about 0 to 1000 parts by weight of at least one organic paint solvent and from about 0 to 140 parts by weight of a $TiO_2$ pigment, i.e. titanium dioxide pigment in the form of vesiculated beads or combinations of $TiO_2$ beads and from about 0.01 to 300 parts by weight of a combination of corrosion-inhibiting pigments consisting essentially of about 10 to 120 parts by weight of at least one zinc phosphate, 40 to 260 parts by weight of zinc molybdate, and 1 to 30 parts by weight of at least one zinc salt of a benzoic acid, e.g. substituted zinc benzoate. For purposes of this invention, all three of the zinc salts, as disclosed herein, are essential in their relative proportions to provide the corrosion resistance required for coatings. Other pigments, and particularly, spherical $TiO_2$ particles and the vesiculated beads e.g. $TiO_2$ beads may be used in combination with the three zinc salts as disclosed herein.

The coating composition of this invention maybe applied as a single coat directly onto a hard surface such as metal, plastic or polymeric surfaces and do not require an undercoat or a top coat to provide a high gloss, corrosion resistant film. It is generally known that low gloss coatings are appropriate for camouflage purposes particularly on most of the outer exposed surfaces of military aircraft and the like. On the other hand, low gloss coatings are not appropriate for the internal or unexposed surfaces such as the areas around engine inlets, ducts, landing gears, etc. Moreover, aircraft other than the military aircraft, require high gloss and high visibility coatings. It was therefore believed that in order to obtain a coating exhibiting outstanding corrosion resistance, the amount of pigment, i.e. (PVC) pigment volume concentration had to be realtively high which would therefore result in a low gloss finish. It was believed that it was not possible to obtain a final coat which had a high gloss and good corrosion resistance at a high pigment volume concentration.

SUMMARY OF THE INVENTION

This invention relates to a corrosion-resistant coating capable of being applied to various substrates as a single top coat having high-gloss, good adhesion and a high degree of flexibility. The corrosion inhibiting coating composition comprises an alkyd resin and a corrosion inhibiting pigment system consisting essentially of critical amounts of zinc phosphate, zinc molybdate and at least one zinc salt of a benzoic acid.

It is an object of this invention to provide a glossy, corrosion-resistant coating, which can be applied directly onto a surface without the need for an undercoat.

It is another object of this invention to provide a coating which is resistant to corrosion and various other chemicals, is flexible, resistant to different weather conditions and has good adhesion to metal substrates.

It is still a further object of this invention to provide a corrosion resistant coating capable of reducing the time, the manpower and the materials normally required for applying said coating on various substrates.

It is still a further object of this invention to provide a one-coat system useful for both military and civilian aircraft of substantially reduced thickness which reduces the weight added to the aircraft while at the same time providing the necessary corrosion resistance.

These and other objects of the invention are accomplished by providing an alkyd resin containing an unique combination of pigments which can be applied on a variety of substrates.

DETAILED DESCRIPTION OF THE INVENTION

This invention relates to a relatively high-gloss, corrosion resistant coating composition which functions as the primary coat or topcoat, has good adhesion characteristics, is highly flexible and resistant to chemical and corrosive environments. More specifically, this invention is directed to a relatively high-gloss, corrosion-resistant coating which comprises for each 100 parts by weight of an alkyd resin, e.g., silicone-alkyd resin from about 0 to 1000 parts by weight of at least one organic paint solvent and preferably from about 50 to 500 parts by weight of a solvent including xylene, toluene, mineral spirits and combinations thereof, and from about 0 to 140 parts by weight of $TiO_2$ pigment e.g., preferably from about 40 to 100 parts by weight of $TiO_2$ pigment. The $TiO_2$ pigment may consist of from about 0 to 100 per cent by weight of the total amount of $TiO_2$ of vesiculated beads. In addition to the above, the coating composition must contain from about 0.1 to 300 parts by weight and preferably from about 20 to 100 parts by weight of a combinaton of corrosion inhibiting pigments consisting essentially of about 10 to 100 parts by weight of at least one zinc phosphate, 40 to 260 parts by weight of zinc molybdate, and 1 to 30 parts by weight of at least one zinc salt of a benzoic acid, e.g. zinc benzoate and/or a zinc salt of a substituted benzoic acid wherein the substituents include $NO_2$ and/or hydroxy radicals. More specifically, the alkyd resin coatings disclosed herein in addition to containing all three of the zinc salts, i.e., zinc phosphate, molybdate and benzoate, may contain also up to 140 parts by weight of a $TiO_2$ pigment wherein 10 to about 100 percent by weight of the total amount of $TiO_2$ in the coating is in the form of $TiO_2$ beads or a combination of said beads with spherical $TiO_2$ pigment.

The alkyd resins may be derived from polybasic acids comprising a polycarboxylic acid having at least two carboxyl groups in the molecule. Examples of such acid compounds include the aliphatic saturated dibasic acids such as succinic acid, adipic acid, azelaic acid, sebacic acid, dodecylsuccinic acid and anhydrides thereof; the aliphatic unsaturated dibasic acids such as maleic acid, fumaric acid, itaconic acid and anhydrides thereof; the aromatic polybasic acids such as phthalic acid, isophthalic acid, terephthalic acid, trimellitic acid, pyromellitic acid and anhydrides thereof; the alicyclic polybasic acids such as tetrahydrophthalic acid, methylcyclohexenetricarboxylic acid, hexahydrophthalic acid, endomethylenephthalic acid, hexachloroendomethylenetetrahydrophthalic acid, tetrachlorophthalic acid, cyclohexanedicarboxylic acid, methylhexahydrophthalic acid, hexahydrotrimellitic acid and anhydrides thereof, etc. These compounds may be used alone or as a mixture of at least two of them.

The polyhydric alcohol used to prepare the alkyd resins include alcohols having at least two hydroxyl groups in the molecule. Examples of such alcohols are ethylene glycol, diethylene glycol, triethylene glycol, propylene glycol, dipropylene glycol, butanediol, neopentyl glycol, butylene glycols, pentanediol, 2,3-dimethylpropanediol, hexanediols, hydrogenated bisphenol-A, cyclohexanedimethanol, trimethylene glycol, tetramethylene glycol, hexamethylene glycol, trimethylolethane, trimethylolpropane, glycerin, pentaerythritol, diglycerin, dipentaerythritol, sorbitol, etc. These alcohols can be used alone or in combination.

The alkyd resins of this invention may include the modified fatty acids. The representative fatty acids are vegetable oil fatty acids. The vegetable oils are drying to semidrying oils (at least about 100 in iodine value) and nondrying oils (less than 100 in iodine value). Examples of fatty acids are derived from drying to semidrying oils such as safflower oil, linseed oil, soybean oil, sesame oil, poppy seed oil, hemp seed oil, corn oil, tall oil, sunflower oil, cotton seed oil, tung oil, dehydrated castor oil, etc. and the nondrying oils such as coconut oil, etc. Of these oils preferable are the drying or semidrying vegetable oil fatty acids. These fatty acids can be used alone or in combination. Spcifically, a mixture of neopentyl glycol, trimethylolpropane, phthalic anhydride, soybean oil fatty acid in xylene can be reacted to obtain a known alkyd resin.

Examples of organic solvents include hydrocarbons such as toluene, xylene, naphtha, mineral spirit, octane and cyclohexane, alcohols such as methanol, ethanol, butanol, cyclohexanol and heptanol, ethers such as dioxane, methyl cellosolve, butyl cellosolve, methyl carbitol and butyl carbitol, esters such as ethyl acetate, butyl acetate, methyl cellosolve acetate, cellosolve acetate and carbitol acetate, ketones such as methyl ethyl ketone, methyl isobutyl ketone, cyclohexanone and isophorone, etc.

These alkyd resins including copolymers such as the alkyd silicone resins may be used alone or with small amounts of other resins such as the phenolic resins, melamine resins, epoxypolybutadiene resins, etc. to improve the adhesion, elasticity, etc. In general, the alkyd resins are in solution at concentrations of up to 60% by weight, and therefore it may not be necessary to add additional solvent. Usually, the content of the non-volatile components in the coating composition of this invention ranges from about 10 to 90% e.g., 25-50% by weight of the total composition. The amount of solvent may vary depending on the viscosity and method of application of the coating onto the substrate.

The pigment system of this invention is unique in that it consists essentially of at least one zinc phosphate, e.g. zinc-barium phosphate, a zinc salt of benzoic acid or a substituted benzoic acid and zinc molybdate. These three zinc salt pigments alone or in combination with other known pigments, e.g. $TiO_2$, provide a coating having outstanding corrosion inhibiting characteristics which enables a single film of the coating to be used as a primer or as the topcoat.

Of the various zinc salts of benzoic acids, the preferred zinc benzoates include the benzoic acid salts having at least one substituent, i.e. the hydroxol and/or the nitro ($NO_2$) substituant. The preferred zinc phosphates, e.g. zinc-barium phosphate, are commercially available as Phos-Plus (J0866) from the Minerals Pigment Corporation. The zinc molybdates are well known zinc compounds commercially available as Moly-White. In addition to the zinc salts pigment system as disclosed herein, other known pigments, particularly titanium dioxide, zinc oxide and the like may be used in the coating to provide reinforcing characteristics and to add color, opacity and hiding power to the coating. In addition, other additives known in the coating art such as color or tinting agents may be added to the binder in small but effective amounts and include such compounds as antimony oxides, barium sulfate, calcium carbonates and one or more of the organic pigments such as the phthalocyanine colors, e.g. greens or blues, etc.

The combination of zinc molybdate, the zinc salts of benzoic acid and the zinc phosphates synergistically improved the corrosion resistance of the coating even at low concentrations. It was found that the specific combination of the zinc molybdate, zinc salts of benzoic acid and zinc phosphates in the relative ratio's stated herein improved the corrosion-resistance substantially when compared to the use of either one of these zinc salts alone. Thus, by decreasing the pigment volume concentration (PVC) of the pigment system in the alkyd binder, a higher gloss coating can be obtained without impairing the corrosion resistance.

The coatings are prepared by mixing all of the ingredients into the alkyd binder and applying the film-forming composition to the substrate in thicknesses ranging from about 0.001 to 0.005 inches or up to about 20 mils but preferably from about 1 to 10 mils thickness. A dispersion or solution of the coating may be accomplished by conventional mixing methods including the use of agitation with a mixer, ball mills, etc. The application of the coating onto the substrate e.g. metal surface, may be made by known coating procedures such as spraying, dipping, brushing, roller coating, etc. The viscosity of the coatings for the particular application may be adjusted by the addition of one or more known organic solvents within the numerical ranges disclosed herein. After the coating is applied to the surface, the solvent is allowed to evaporate at room or elevated temperatures and the film cures to a coating having the desired characteristics.

The particular zinc phosphate used in preparing the coating composition has an average particle size of about 5.0 microns and is characterized as a zinc-barium phosphate. The zinc salt of benzoic acid was specifically characterized as having at least one hydroxyl group and nitro ($NO_2$) substituent with a molecular weight of about 100-500, a density of about 2-3 grams per mililiter and a particle specific surface area of $16m^2$/gram. The benzoic acid salts are commercial products obtained from BASF identified as Sicorin-RZ. The zinc molybdate has a particle size average of about 4.0 microns and is commercially available as Moly-White 101. The titanium dioxide is preferably spherical with a particle size of about 0.25 microns. The term zinc phosphate includes the mixed zinc salts and particularly the zinc-barium phosphates, zinc-aluminum phosphates and various combinations of zinc phosphate with mixed zinc phosphate salts in any proportion.

The coating composition may contain other additives such as an ultraviolet light stabilizer, an antioxidant, etc. The ultraviolet light stabilizer can be present in amounts of 1-10% by weight, based on the weight of the binder; the antioxidant can be present in amounts of 0.1-3% by weight, based on the weight of the binder. Typical ultraviolet light stabilizers are benzophenones, triazoles, triazines, substituted benzenes, organophosphorous sulfides, and substituted nitriles. The coating composition of this invention may also contain other known materials, such as driers, antioxidants, fungicides, etc. in amounts for their intended function. Thus, organic salts (e.g., an octoate or naphthenate) of metals (e.g., cobalt, calcium or manganese) are available from Nuodex Corporation under the name "Nuxtra". The coating composition may also contain fillers which may or may not have pigmentary properties. These fillers are exemplified as talc, silica, barium sulfate, calcium sulfate, calcium carbonate, calcium silicate, iron oxides, mica, aluminum silicate and mixtures thereof.

The coating composition of this invention can be applied to a variety of substrates by conventional methods. Substrates that can be coated with the composition are, for example, metal, wood, glass, or plastics such as polypropylene, polystyrene, copolymers and the like. The coating is suited also for application over pretreated or unprimed metal.

The hydrocarbon solvents useful for purposes of this invention includes a mixture of solvents, e.g. mixtures of one or more paint solvents such as benzene, toluene, xylene, and aromatic naphtha. Other solvents include the ester solvents such as ethyl acetate, butyl acetate, cellosolve, hexyl acetate, amyl acetate, ethyl proprionate, and butyl proprionate. Ketone solvents include acetone, methyl ethyl ketone, methyl isopropyl ketone, methyl isobutyl ketone, diethyl ketone, and cyclohexanone. Glycol ester solvents include ethylene glycol monoethyl ether acetate, diethylene glycol monoethyl ether acetate, etc.

The coating has outstanding performance when exposed to high intensity of light, extreme cold conditions, hot lubricating oils and other chemicals normally found in aircraft operations. By utilizing the coating composition of this invention, a high gloss, corrosion resistant film can be obtained on various substrates. The coating has properties which function as a primer and more important as a top coat highly adherent, flexible, and resistant to all weather conditions. The coatings of this invention lowers the risk of failure due to cracking especially at low temperatures and are easily touched-up since only one coating need by applied. Since one coat is sufficient, it needs less time for application and removal and saves on manpower that would generally be needed in the preparation of a high gloss two coat system. Moreover, the present coating provides protection at lower film thicknesses thereby reducing the weight of the coating compared to a two coat paint system which is important for aircraft coatings.

The following illustrate the coating compositions of this invention.

EXAMPLE I

| ALKYD RESIN | |
|---|---|
| Components | Parts by Weight |
| Silicone-alkyd resin (50% solids) (385-50E) | 60.2 |
| TiO$_2$ (50% VSBD) | 29.5 |
| Zinc-Barium Phosphate (Phos-Plus J0866) | 3.0 |
| Zinc Salt of nitro-substituted Benzoic Acid (Sicorin-RZ) | 0.3 |
| Zinc Molybdate (Molywhite) | 6.0 |
| Organic Paint Solvents | 1.0 |
| | 100.0 |

The above composition has the following characteristics:
PVC = 0.229
Wet Density (g/ml) = 1.35

EXAMPLE I-continued

ALKYD RESIN

| | |
|---|---|
| VOC (g/l) = | 420. |
| Vol. % Solids = | 0.556 |

The degree of anti-corrosion performance of the coating can be measured by ASTM test D610-68 entitled "Evaluating Degree of Rusting on Painted Steel Surfaces", ASTM D1654-79a entitled "Evaluation of Painted or Coated Specimens Subjected to Corrosive Environments", and ASTM D714-56 entitled "Evaluating Degree of Blistering of Paints". The coating can be tested further in ASTM B117-73, entitled "Method of Salt Spray (Fog) Testing" wherein the composition is applied onto steel panels which are scribed and subjected to salt-fog spray. Scribing is achieved by scratching an "X" in the coating through to bare steel using a cutting tool. The amount of rusting at the scribe is assessed on a scale of 0-10 where 10 is no corrosion and 0 is complete failure. Ratings of 5 and above are acceptable for anti-corrosive compositions tested in accordance with ASTM D-1654-79.

Scribe creepage or underfilm corrosion is determined in accordance with ASTM D1654-79a on a scale of 0-10 where 10 is no corrosion and 0 is ⅜ inch or more creepage from the scribe. Blistering in a coating is determined in accordance with ASTM D714-56. This method describes blister size as numbers 2, 4, 6, 8, and 10, where 2 is a large blister ¼ inch or larger in diameter, 8 is a small blister less than 1/16 inch in diameter and 10 is the absence of blistering. Blister density is described as D means dense, MD means medium dense, M means medium, and F means few.

It is obvious that there are other variations and modifications which can be made with respect to this invention without departing from the spirit and scope of the invention as particularly set forth in the appendant claims.

The invention claimed:

1. A coating composition comprising about 100 parts by weight of an alkyd resin from about 0 to 1000 parts by weight of at least one organic solvent, from about 0-140 parts by weight of a TiO$_2$ pigment, and from about 0.01 to 300 parts by weight of a combination of corrosion-inhibiting pigments consisting essentially of about:
   (a) 10-120 parts by weight of a zinc phosphate,
   (b) 40-260 parts by weight of zinc molybdate, and
   (c) 1-30 parts by weight of at least one zinc salt of a benzoic acid.

2. The coating composition of claim 1 further characterized in that the zinc salt is a substituted zinc benzoate.

3. The coating composition of claim 1 further characterized in that the zinc phosphate is a zinc-barium phosphate.

4. The coating composition of claim 1 further characterized in that from 0 to 100% by weight of the total amount of the TiO$_2$ pigment in the coating is in the form of vesiculated beads.

5. The coating composition of claim 1 further characterized in that from 10 to about 50% by weight of the total amount of the TiO$_2$ pigment in the coating is in the form of vesiculated beads.

6. The coating composition of claim 4 further characterized in that the TiO$_2$ pigment is present in the coating in an amount ranging from about 40-100 parts by weight.

7. The coating composition of claim 1 further characterized in that the combination of corrosion-inhibiting pigments is present in an amount ranging from about 20 to 100 parts by weight.

8. The coating composition of claim 1 further characterized in that the alkyd resin is a silicone-alkyd resin and the combination of corrosion-inhibiting pigments consist essentially of about:
   (a) 30-100 parts by weight of a zinc-barium phosphate,
   (b) 60-210 parts by weight of a zinc molybdate, and
   (c) 3-25 parts by weight of a zinc salt of a benzoic acid.

9. The coating composition of claim 8 further characterized in that the zinc salt of the benzoic acid is a substituted benzoic acid.

10. The coating composition of claim 9 further characterized in that the substituted benzoic acid is a hydroxy and NO$_2$- substituted benzoic acid.

11. The coating composition of claim 9 further characterized in that the substituted benzoic acid is a NO$_2$-substituted benzoic acid.

12. A method of preparing a corrosion-inhibiting coating which comprises adding to an alkyd resin from about 0.01 to 300 parts by weight for every 100 parts by weight of resin of a combination of pigment consisting essentially of from about 10 to 120 parts by weight of a zinc phosphate, 40 to 260 parts by weight of zinc molybdate and 1 to 30 parts by weight of at least one zinc salt of benzoic acid.

13. The method of claim 12 further characterized in that from about 50 to 500 parts by weight of at least one organic solvent is present for each 100 parts by weight of said alkyd resin.

14. The method of claim 13 further characterized in that the coating contains from about 0 to 140 parts by weight of TiO$_2$ pigment.

15. The method of claim 14 further characterized in that the zinc phosphate is a zinc barium phosphate and 10 to 50 percent by weight of the total amount of TiO$_2$ pigment is in the form of vesiculated beads.

* * * * *